(12) United States Patent
Matsuoka

(10) Patent No.: US 11,250,003 B2
(45) Date of Patent: Feb. 15, 2022

(54) SEARCH CIRCUIT

(71) Applicant: RENESAS ELECTRONICS CORPORATION, Tokyo (JP)

(72) Inventor: Hideto Matsuoka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 7 days.

(21) Appl. No.: 16/852,023

(22) Filed: Apr. 17, 2020

(65) Prior Publication Data

US 2020/0387512 A1    Dec. 10, 2020

(30) Foreign Application Priority Data

Jun. 7, 2019 (JP) .............................. JP2019-107258

(51) Int. Cl.
*G06F 16/248* (2019.01)
*G06F 16/2455* (2019.01)

(52) U.S. Cl.
CPC ...... *G06F 16/24558* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 6,522,632 B1* | 2/2003 | Waters | ................ | G06F 16/9566 370/254 |
| 7,711,893 B1* | 5/2010 | Venkatachary | ........ | G11C 15/00 711/108 |
| 8,358,654 B1* | 1/2013 | Krivitski | ............. | H04L 45/7457 370/392 |
| 2001/0056417 A1* | 12/2001 | Cao | .................... | G06F 16/90344 |
| 2002/0118682 A1* | 8/2002 | Choe | ....................... | H04L 45/00 370/395.31 |
| 2003/0135495 A1* | 7/2003 | Vagnozzi | ................ | G06F 16/31 |
| 2009/0216910 A1* | 8/2009 | Duchesneau | ........... | H04L 41/04 709/250 |
| 2012/0110049 A1* | 5/2012 | Lines | ................ | G06F 16/90348 708/212 |
| 2015/0278283 A1* | 10/2015 | O'Krafka | ............. | G06F 16/2246 707/609 |
| 2016/0112319 A1* | 4/2016 | Hasani | ................ | H04L 45/7453 370/392 |

(Continued)

OTHER PUBLICATIONS

B. Lampson et al., "IP Lookups using Multiway and Multicolumn Search", 1998 IEEE, pp. 1248-1256.

*Primary Examiner* — Wilson Lee
(74) *Attorney, Agent, or Firm* — McDermott Will & Emery LLP

(57) ABSTRACT

A search circuit includes a search table including a plurality of entry data, a search processing unit receiving a search key and performing a binary search operation for the search table. Each of the plurality of entry data includes a search data, a prefix length data and a search result data. The search processing unit reads one of the plurality of entry data from the search table according to a binary search operation, specifies a search target range based on the search data and the prefix length data in the read entry data, determines whether the search key is included in the search target range, and outputs the search result data of the read entry data based on a determination result.

20 Claims, 14 Drawing Sheets

(56) References Cited

U.S. PATENT DOCUMENTS

2017/0277431 A1\* 9/2017 Kuroda .................. G06F 3/064
2018/0213067 A1\* 7/2018 Yeh ........................ H04L 69/22
2019/0197175 A1\* 6/2019 Purcell ................ G06F 16/2425

\* cited by examiner

FIG. 3A

|  |  |  | 201 |
|---|---|---|---|
| TABLE ADDRESS | SEARCH DATA | SEARCH RESULT | |
| | | Key>Data (201-2) | Key==Data (201-1) |
| 0 | 0000 | P3 | P3 |
| 1 | 0010 | P0 | P0 |
| 2 | 0011 | P3 | P0 |
| 3 | 0100 | P1 | P1 |
| 4 | 0101 | P3 | P1 |
| 5 | 0111 | Miss | P3 |
| 6 | 1010 | P2 | P2 |
| 7 | 1011 | Miss | P2 |

Key=0010
Key=0110

| MEMORY ACCESS | SEARCH FOR Key=0010 | | | SEARCH FOR Key=0110 | | |
|---|---|---|---|---|---|---|
| | TABLE ADDRESS | SEARCH DATA | HIGH OR LOW | TABLE ADDRESS | SEARCH DATA | HIGH OR LOW |
| 0 | 4 | 0101 | Low | 4 | 0101 | High |
| 1 | 2 | 0011 | Low | 6 | 1010 | Low |
| 2 | 1 | 0010 | Hit | 5 | 0111 | Low |

FIG. 5A

Table 400 (Entry Candidate Data):

| ENTRY ADDRESS | SEARCH TARGET DATA | SEARCH RESULT |
|---|---|---|
| 0 | 001* | P0 |
| 1 | 010* | P1 |
| 2 | 111* | P2 |
| 3 | 10** | P3 |

RANGE OF Entry0: 0010(L0) → 0100(L1)
RANGE OF Entry1: 0100(L1) →
RANGE OF Entry3: 1000(L3) →
RANGE OF Entry2: 1110(L2) →

Table 401:

| TABLE ADDRESS | SEARCH DATA | PREFIX LENGTH | SEARCH RESULT | |
|---|---|---|---|---|
| 0 | 0010 | 3 | P0 | L0(Entry0) |
| 1 | 0100 | 3 | P1 | L1(Entry1) |
| 2 | 1000 | 2 | P3 | L3(Entry3) |
| 3 | 1110 | 3 | P2 | L2(Entry2) |

FIG. 6A

| TABLE ADDRESS | SEARCH DATA | RREFIX LENGTH | SEARCH RESULT | |
|---|---|---|---|---|
| 0 | 0000 | 1 | P3 | (Entry3-0) |
| 1 | 0010 | 3 | P0 | (Entry0) |
| 2 | 0100 | 3 | P1 | (Entry1) |
| 3 | 0110 | 1 | P3 | (Entry3-1) |
| 4 | 1010 | 3 | P2 | (Entry2) |

Key=0010
Key=0110

SEARCH FOR Key=0010

| MEMORY ACCESS | TABLE ADDRESS | SEARCH DATA | PREFIX LENGTH | UPPER LIMIT VALUE | HIGH OR LOW | Hit Miss | TEMPORARY SEARCH RESULT |
|---|---|---|---|---|---|---|---|
| 1 | 2 | 0100 | 3 | 0101 | Low | Miss | |
| 2 | 0 | 0000 | 1 | 0111 | High | Hit | P3 |
| 3 | 1 | 0010 | 3 | 0011 | | Hit | P0 |

FIG. 6C

SEARCH FOR Key=0110

| MEMORY ACCESS | TABLE ADDRESS | SEARCH DATA | PREFIX LENGTH | UPPER LIMIT VALUE | HIGH OR LOW | Hit Miss | TEMPORARY SEARCH RESULT |
|---|---|---|---|---|---|---|---|
| 1 | 2 | 0100 | 3 | 0101 | High | Miss | |
| 2 | 4 | 1010 | 3 | 1011 | Low | Miss | |
| 3 | 3 | 0110 | 1 | 0111 | | Hit | P3 |

FIG. 10

| ENTRY ADDRESS | ENTRY DATA | |
|---|---|---|
| | SEARCH TARGET DATA | SEARCH RESULT |
| 0 | 000* | P0 |
| 1 | 010* | P1 |
| 2 | 100* | P2 |
| 3 | 110* | P3 |
| 4 | **** | P4 |

404

| TABLE ADDRESS | SEARCH DATA | PREFIX LENGTH | SEARCH RESULT | |
|---|---|---|---|---|
| 000 | 0000 | 3 | P0 | (Entry0) |
| 001 | 0010 | 0 | P4 | (Entry4-0) |
| 010 | 0100 | 3 | P1 | (Entry1) |
| 011 | 0110 | 0 | P4 | (Entry4-1) |
| 100 | 1000 | 3 | P2 | (Entry2) |
| 101 | 1010 | 0 | P4 | (Entry4-2) |
| 110 | 1100 | 3 | P3 | (Entry3) |
| 111 | 1110 | 0 | P4 | (Entry4-3) |

| TABLE ADDRESS | SEARCH DATA | PREFIX LENGTH | SEARCH RESULT |
|---|---|---|---|
| 000 | 0000 | 3 | P0 |
| 001 | 0100 | 3 | P1 |
| 010 | 1000 | 3 | P2 |
| 011 | 1100 | 3 | P3 |
| 100 | 1110 | 0 | P4 |
| 101 | | | |
| 110 | | | |
| 111 | | | |

408

Key (0111)

SEARCH FOR Key=0111

| MEMORY ACCESS | TABLE ADDRESS | SEARCH DATA | PREFIX LENGTH | UPPER LIMIT VALUE | HIGH OR LOW | Hit Miss | TEMPORARY SEARCH RESULT |
|---|---|---|---|---|---|---|---|
| 1 | 4 | 1110 | 0 | 1111 | Low (*1) | Hit | P4 |
| 2 | 2 | 1000 | 3 | 1001 | Low (*2) | Miss | |
| 3 | 1 | 0100 | 3 | 0101 | High (*3) | Miss | |

(*1) Key(=0111)＜Data(=1110)
(*2) Key(=0111)＜Data(=1000)
(*3) Key(=0111)＞Data(=0100)

SEARCH CIRCUIT

CROSS-REFERENCE TO RELATED APPLICATIONS

The disclosure of Japanese Patent Application No. 2019-107258 filed on Jun. 7, 2019 including the specification, drawings and abstract is incorporated herein by reference in its entirety.

BACKGROUND

The present disclosure relates to a search circuit for searching a search table in which a plurality of entry data are stored for a match between input search keys.

In an IP network, a network device such as a router generates a database called Forwarding Information Base, which stores destination ports of packet data corresponding to destination IP addresses, in order to determine a destination of a received packet.

Upon receiving the packet, the router searches the FIB by using the destination IP address added to the header information of the packet data as a search key and determines the transfer destination of the packet based on the search result.

Each IP address stored in the FIB defines a search valid bit length called a prefix length.

In the search of the FIB, an entry having the longest valid bit length and matching the destination IP address being the search key is output as a search result from the table entry.

Such a search process is called Longest-Prefix-Match search. When performing an LPM search, a CAM (content reference memory: Content Addressable Memory) is used.

When CAM is used, high search performance can be realized, but it is expensive and consume a large amount of power as compared with general-purpose memories such as DRAM and SRAM.

In recent years, the number of IP addresses has been increasing with the expansion of IP networks, and the corresponding FIB capacitance has been increasing proportionately. Therefore, it has become difficult to store and search a large-capacity FIB database in a CAM which is expensive and consumes a large amount of power.

There are disclosed techniques listed below.
[Non Patent Document 1]
"IP Lookups using Multiway and Multicolumn Search", Butler Lampson, V Srinivasan and George Varghese, IEEE 1998

SUMMARY

On the other hand, by using a search method based on various search algorithms such as a tree bitmap (Tree-Bit-Map) algorithm, a method of performing LPM search using a relatively inexpensive and low-power-consumption DRAM or SRAM has been proposed (Non Patent Document 1).

In recent years, a shift to a IPv6 address having a longer bit length has begun due to a problem of exhaustion of a IPv4 address. However, in a method using a tree bitmap search algorithm characterized in that the search performance deteriorates in proportion to the search key length, a problem arises in that the performance deteriorates in a IPv6 in which the search key length changes from 32 bits of IPv4 to 128 bits.

In addition, methods of using a binary search algorithm other than a tree bitmap algorithm as a search algorithm for LPM search have been proposed (Non Patent Document 1).

In a binary search algorithm, the search performance depends on the capacity of the search database rather than the search key length.

Although the same performance as that of IPv4 address search can be realized even when IPv6 address is searched, on the other hand, the search performance is proportional to the capacity. If the LPM search can be realized with a smaller capacity memory, the search performance can be improved.

The present disclosure has been made to solve the above-mentioned problems, and provides a search circuit capable of executing a search processing with a small-capacity memory.

Other objects and novel features will become apparent from the description of this specification and the accompanying drawings.

According to one embodiment, a search circuit comprises a search table having a plurality of entry data, each of the plurality of entry data including a search data, a prefix length data and a search result data, and a search processing unit configured to receive a search key and to perform a binary search operation for the search table. The search processing unit reads one of the plurality of entry data from the search table according to the binary search operation, specifies a search target range based on the search data and the prefix length data which are included in a read entry data, determines whether the search key is included in the search target range, and outputs the search result data of the read entry data based on a determination result.

According to one Embodiment, the disclosed search circuitry is capable of executing search processing in small-capacity memories.

BRIEF DESCRIPTION OF THE DRAWINGS

FIGS. 3A and 3B are diagrams illustrating a search processing for the search table as comparative examples.

FIGS. 5A and 5B are diagrams illustrating generation of a search table according to first embodiment.

FIGS. 6A to 6C are diagrams for explaining a search processing for the search table according to first embodiment.

FIG. 10 is a diagram illustrating generation of another search table according to first embodiment.

FIG. 12 is a diagram for explaining a search processing for the search table according to third embodiment.

DETAILED DESCRIPTION

Figure 1:
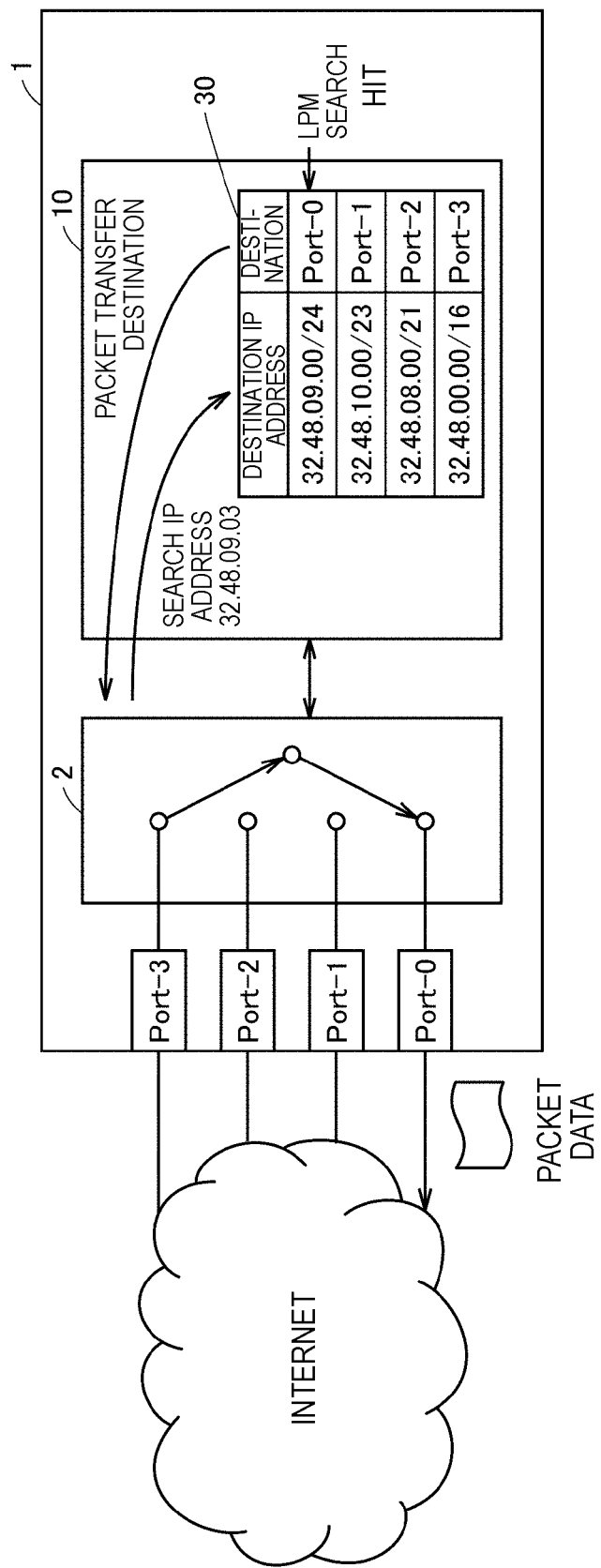
FIG. 1 is a diagram for explaining a configuration of a communication device 1 based on first embodiment.

Embodiments will be described in details. In the drawings, the same or corresponding components are denoted by the same reference numerals, and description thereof will not be repeated.

First Embodiment

<Overall Configuration of Communication Device>

FIG. 1 is a diagram illustrating a configuration of a communication device 1 based on first embodiment.

As shown in FIG. 1, the communication device 1 is a communication device such as a switch or a router. The communication device 1 is connected to the Internet. The communication device 1 executes packet data transfer processing.

The communication device 1 includes a plurality of ports (Port-0 to Port-3), switch 2, and search circuit 10.

The switch 2 switches the connection destination of the port. In the present embodiment, the communication device 1 receives the packet data and executes the transfer process of transferring the received packet data to the port designated by the search processing of the search circuit 10.

Here, the search circuit 10 includes a search table 30, and performs a search operation by using the search method of LPM (Longest-Prefix-Match) search.

The search table 30 stores a plurality of entry data. As an illustration, the destination IP address "32.48.09.00/24" is stored in association with the destination port (Port-0). The destination IP address "32.48.10.00/23" is stored in association with the destination port (Port-1). The destination IP address "32.48.08.00/21" is stored in association with the destination port (Port-2). The destination IP address "32.48.00.00/16" is stored in association with the destination port (Port-3).

Here, the case where the search IP address "32.48.09.03" is received as the search key is shown.

The received search key matches the four entry data stored in the search table 30.

The search circuit 10 outputs, as a search result, entry data having the longest valid bit length among entry data matching the search IP address serving as a search key.

In the present embodiment, the destination IP address "32.48.09.00/24" having the prefix length of 24 bits having the longest valid bit length among the entry data matching the search IP address is outputted as the search result.

Therefore, the packet data is transferred to the port (Port-0) which is the corresponding transfer destination, and the packet data is sent to the destination.

Binary Search Algorithms According to Comparative Example

As a comparative example, a case where an LPM search is performed by a conventional binary search algorithm will be described.

Figure 2:
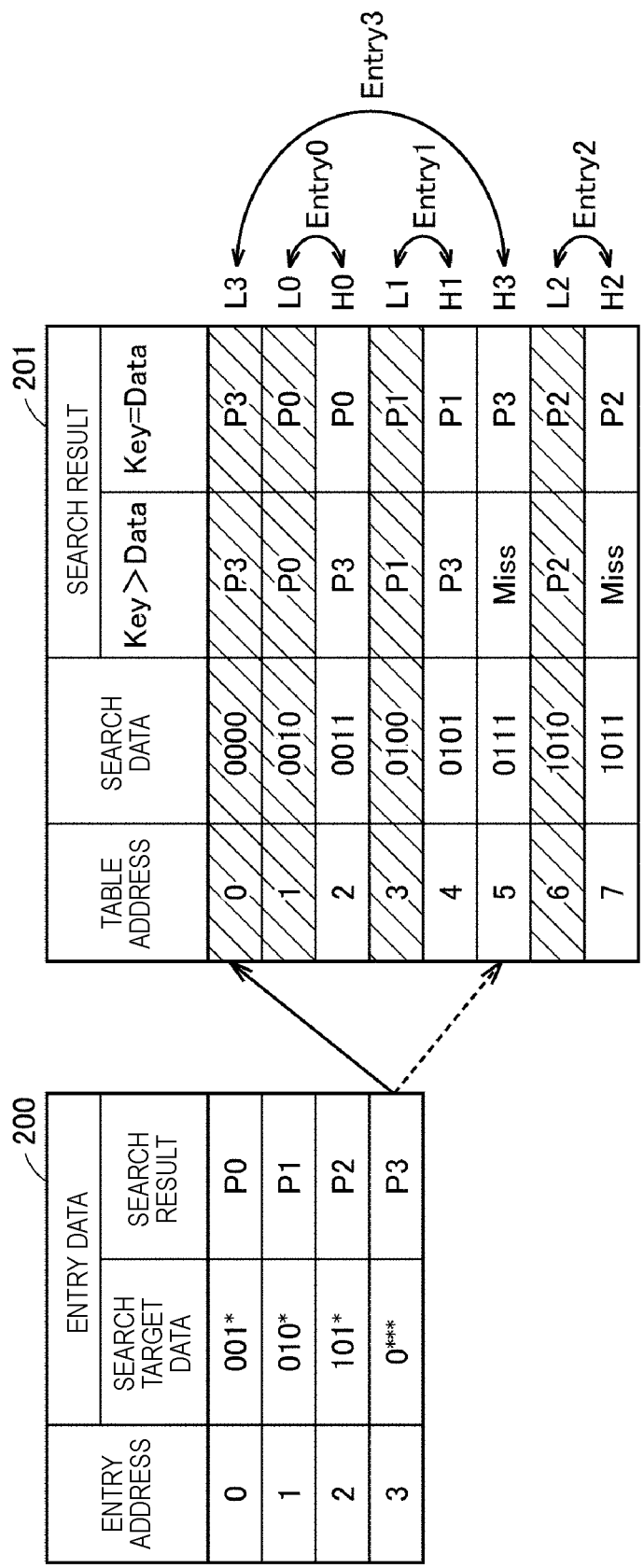
FIG. 2 is a diagram illustrating a search table provided as a comparative example.

The above comparative examples are of the method shown in Non Patent Document 1. FIG. 2 is a diagram illustrating a search table provided as a comparative example.

Referring to FIG. 2, the search table 200 stores a plurality of entry data. As an example, a case where four entry data are stored is shown.

The entry data includes search target data having a data length of 4 bits and search result data to be output as a search result when search data matches the search key.

If the search table 200 is a FIB, the search target data corresponds to the destination IP address, and the search result corresponds to the transfer destination port.

The entry data of the search table 200 includes bits to be masked. The entry data matches a plurality of search keys corresponding to the masked bits.

For example, each entry data stored in the search table 200 has a search target range in which a lower limit value and an upper limit value described below are set as boundary values, respectively.

Table 1

TABLE 1

| ENTRY DATA | LOWER LIMIT VALUE | UPPER LIMIT VALUE | SEARCH OBJECT RANGE |
|---|---|---|---|
| 001* | 0010 (L0) | 0011 (H0) | 0010-0011 |
| 010* | 0100 (L1) | 0101 (H1) | 0100-0101 |
| 101* | 1010 (L2) | 1011 (H2) | 1010-1011 |
| 0*** | 0000 (L3) | 0111 (H3) | 0000-0111 |

In the comparative example, an LPM search is performed by a binary search. FIG. 2 shows a search table 201 for performing the LPM search according to the binary search disclosed in Non Patent Document 1.

The lower limit value and the upper limit value of the entry data in the search table 200 are included as binary search (Binary-Search) data, and the search table 201 is generated by sorting the entry data in ascending order.

Therefore, the search table 201 stores eight entry data that are twice as large as the search table 200.

The search table 201 stores data in two cases corresponding to the search key as a search result.

The search result includes search result data when the search key matches the stored search data (Key=Data) and search result data when the search key is larger than the stored search data (Key>Data).

FIGS. 3A and 3B are diagrams illustrating a search processing for the search table 201 as a comparative example.

In the illustrated 3A, a search table 201 is illustrated, and a search processing for the search keys "0010" and "0110" is performed.

The case of the search key "0010" will be described. When the binary search operation is performed using the search key "0010" in the search table 201, the search result data "P0" is outputted because the search key matches the search data at the table address "1" (Key=Data).

In FIG. 3B, the search process is shown, and the "HIGH OR LOW" is a determination result indicating whether the search key (Key) is low or High with respect to the search data (Data).

The binary search operation starts at the intermediate table address "4" of the search table 201. When it is determined that the search key is lower than the search key (low), the lower address is read out in the order as shown in the FIG. 3B, and when it is determined that the search key is larger (High), the upper address is read out.

The same search is performed for the case of the search key "0110". However, when the search table 201 is binary searched using the search key "0110", the search data of the table entry matching the search key "0110" does not exist.

In this instance, the search result is an intermediate value between the table addresses "4" and "5". That is, the intermediate value (0110) between the upper limit value of the entry data "010*" (Entry1) and the upper limit value of the entry data "0***" (Entry3) is indicated. In the search process, the search key is larger than the search data of the table address "4" which is the upper limit of the entry data (Entry1) (Key(0110)>Data(0101)). Further, the search key is smaller than the search data of the table address "5" which is the upper limit of the entry data (Entry3) (Key(0110)

<Data(0111)>). Therefore, the search result is an intermediate value of the search data of the table addresses "4" and "5".

In this comparative example, the search result data 201-2 is provided in the search table 201, for when the search result of the binary search operation becomes an intermediate value of each search data. For example, the search data of the table address "4" is the upper limit value (H1) of Entry1 of the search table 200 shown in FIG. 2, and is included in the search target range (L3 to H3) of Entry3 of the search table 200. Therefore, when the search key is larger than the upper limit value of Entry1 (the search data (H1) of the table address "4") and is within the range up to the upper limit value of Entry3 (the search data (H3) of the table address "5"), the search key hits to Entry3. Therefore, the search table 201 has search result data 201-2, and stores "P3" which is a search result data of Entry 3 as a search result when the search key is larger than the search data of the table address "4".

As mentioned above, the search result in the binary search of the search key "0110" is intermediate between table addresses "4" and "5". Therefore, "P3", which is stored in the search result data (201-2) of table address "4" in the case of Key>Data, is outputted as the determination result corresponding to a search target range including table address "4" and table address "5" adjacent to the table address "4".

If the search key does not match the search data stored in the search table 201 in the normal binary search, the search key does not match the search data (referred to as "Miss").

The capacity of the search table according to the method according to this comparative example will be described. The search table 201 for performing the binary search operation used in the search stores two search data, i.e., a lower limit value and an upper limit value per entry data of the original search table 200.

Therefore, when the search table 201 is generated from the search table 200 of N pieces of entry data, 2N table addresses are required in the worst case.

Therefore, in the method according to the comparative examples, for performing LPM search for the search table of N-entry data, it is required to prepare a memory having a 2N memory space.

Further, two pieces of data are stored in each memory address of the search table 201 as data to be output as a search result. One is the search result data when the search key matches the search data (Key=Data) and the other is the search result data when the search key is larger than the search data (Key>Data).

For example, when the search table 200 has 1M entry data, 20 bits are required for the search result data when the entry addresses are outputted as the search result data in the same manner as the CAMs. Therefore, when the above method is adopted, 40 bits are required as the search result data.

For example, when the search table 200 is a search table based on IPv4 addresses and has 1M entry data, and when the search table 201 is generated from the search table 200, the following memory capacity is required.
Table 2

TABLE 2

| | ADRESS | SEARCH DATA | SEARCH RESULT DATA | MEMORY CAPACITY |
|---|---|---|---|---|
| SEARCH TABLE 200 | 1M | 38 bit (*1) | 20 bit × 1 | 760 Mbit |
| SEARCH TABLE 201 | 2M | 32 bit | 20 bit × 2 | 2560 Mbit |

As shown in Table 2, the search table 201 used for the LPM search requires more than twice the memory capacity of the original search table 200.

In addition, the memory address space also increases from N to 2N. Thus, since the memory address space increases by a factor of two, the number of memory accesses when performing the binary search operation increases compared with the number of entries N of the original search table 200. As a result, there is a problem that the speed cannot be increased.

Further, when the search table is updated, it is necessary to sort the entry data in order of value. For example, in the case where new entry data is added to the minimum position of the table with respect to the search table having N pieces of data, it is necessary to move all the existing entry data because new entry data needs to be inserted into the minimum address position.

In the case of constructing the search table 201, the number of times data is moved in the worst case depends on the number of entries. Therefore, when the memory address space increases from N to 2N, the time for constructing the search table also increases.

Figure 4:
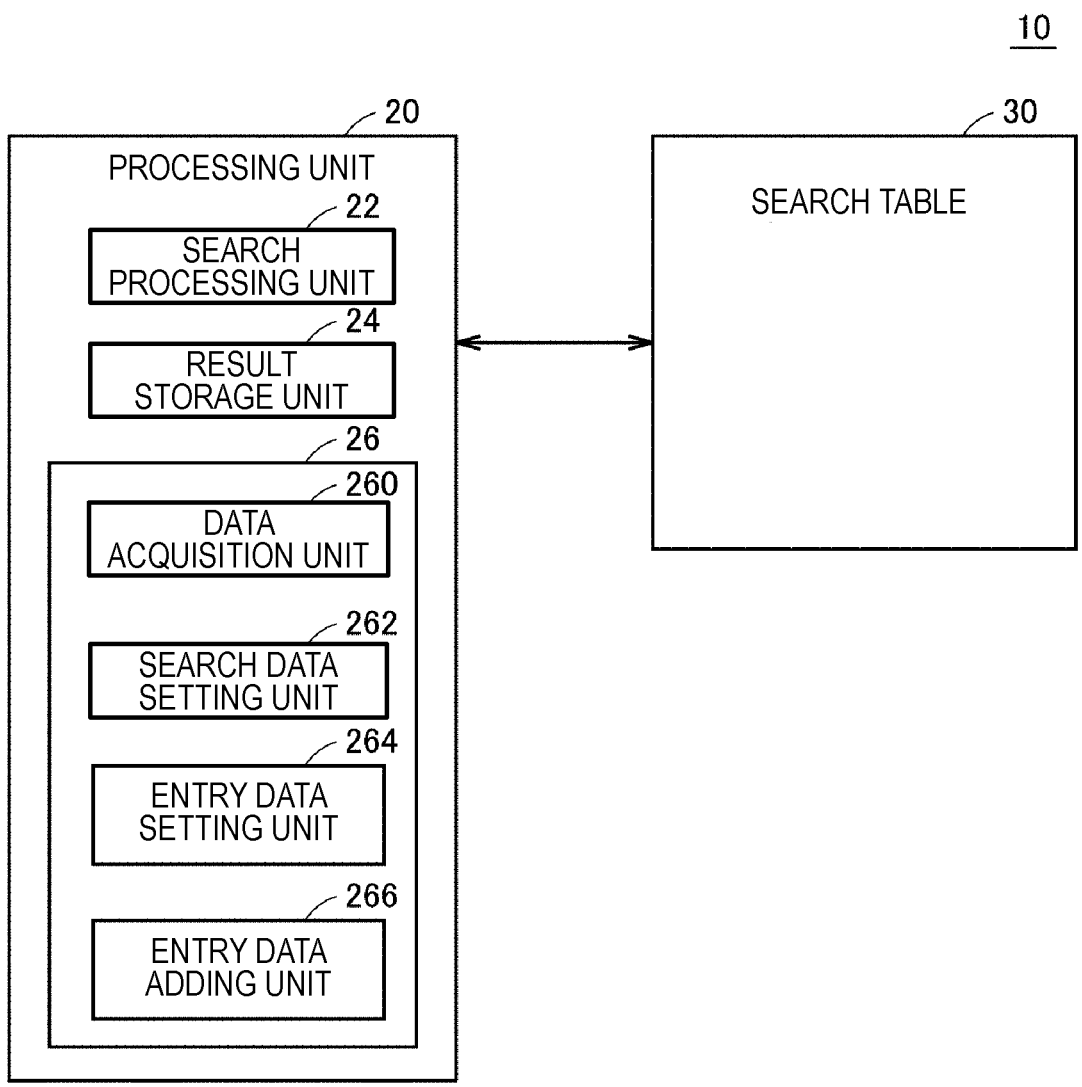
FIG. 4 is a functional block diagram of the search circuit 10 according to first embodiment.

Therefore, it is desired to reduce the number of entry data in the search table. FIG. 4 is a functional diagram of the search circuit 10 in accordance with first embodiment.

Referring to FIG. 4, search circuit 10 includes a processing unit 20 and a search table 30. In this present embodiment, each functional block is realized by executing a program stored in a memory accessible by the CPU as a function of the processing unit 20.

The processing unit 20 executes various processes on the search table 30, and includes a search processing unit 22, a result storage unit 24, and a table generation unit 26.

The search processing unit 22 performs a binary search operation on the search table 30. The search processing unit 22 stores the result of the binary search operation in the result storage unit 24.

The table generation unit 26 generates entry data of the search table 30 used in the binary search operation of the search processing unit 22 from the original search table. The original search table may be set by the user or may be generated by the search execution system based on a program.

The table generation unit 26 includes a data acquisition unit 260, a search data setting unit 262, an entry data setting unit 264, and an entry data adding unit 266.

The data acquisition unit 260 acquires entry candidate data included in the original search table. The search data setting unit 262 sets, as search data, one piece of data in the search target range indicated by the entry candidate data acquired by the data acquisition unit 260.

The entry data setting unit 264 associates the search data with the prefix length data and sets the search data as entry data of the search table 30.

The entry data addition setting unit 266 determines whether or not another search data of another search target data is included in the search target range indicated by the search target data, and sets an additional entry data when another search data is included.

<Generation of Search Table>

Each of entry data stored in the search table according to the first embodiment includes a search data, a prefix length data, and a search result data.

Based on the search data and the prefix length data included in each entry data of the search table, a search data group (search target range) as a target of each entry data is calculated. That is, the upper limit value and the lower limit value of the search data in the search data group are calculated. For example, when the search data is "0100" and the prefix length is "3", it is understood that the original search data is "010*". Therefore, it can be seen that the search target range of the search data has an upper limit value of "0101" and a lower limit value of "0100".

In the present embodiment, a case will be described in which, for example, a lower limit value of a search data group is set as the search data stored in the entry data. The value is not limited to the lower limit value, and can be set to an arbitrary value between the upper limit value and the lower limit value of the search data group.

The table generation unit 26 generates the search table 30 from the original search table composed of the entry candidate data.

FIG. 5A is a diagram illustrating generation of a search table according to first embodiment. FIG. 5A shows an original search table 400.

The original search table 400 stores a plurality of entry candidates Entry0 to 3 to be searched for at entry addresses 0 to 3, respectively. In the present embodiment, four entry candidate data are stored in the original search table 400.

The entry candidate data includes search target data including a bit to be masked, and search result data to be output as a search result when the search target data matches the search key.

In the center of FIG. 5A, the search target ranges of the original search table 400 according to first embodiment are shown.

The search target range of each entry candidate data is shown in FIG. 5A. Specifically, the search target range of the search target data "001*" of the entry candidate data Entry0, the search target range of the search target data "010*" of the entry candidate data Entry1, the search target range of the search target data "111*" of the entry candidate data Entry2, and the search target range of the search target data "10**" of the entry candidate data Entry3 are shown.

In this case, the search target ranges of the entry candidate data do not overlap. That is, the search target range of each entry candidate data is not divided by the search target range of the other entry candidate data.

A diagram illustrating a search table 401 according to first embodiment is shown in FIG. 5A. The search data setting unit 262 sets the lower limit value of the search target range indicated by the search target data of each entry candidate data of the original search table 400 as the search data of the search table 401. Then, the entry data setting unit 264 sets entry data associating the search data with the prefix length data and the search result data.

The entry data setting unit 264 stores the entry data set by the search data setting unit 262 in the search table 401.

The entry data setting unit 264 sorts the stored entry data, and stores the entry data including the search data having a small value at the position where the table address is small.

For example, the search data "0010", the prefix length data "3", and the search result data "P0" corresponding to the entry candidate data Entry0 are stored in the table address "0". For example, the search data "0100", the prefix length data "3", and the search result data "P1" corresponding to the entry candidate data Entry1 are stored in the table address "1".

For example, the search data "1000", the prefix length data "2", and the search result data "P3" corresponding to the entry candidate data Entry3 are stored in the table address "2".

For example, the search data "1110", the prefix length data "3", and the search result data "P2" corresponding to the entry candidate data Entry2 are stored in the table address "3".

In the present embodiment, since the search target range of each entry candidate data is not divided by the search target range of other entry candidate data, new entry data is not added.

Next, a case where the search target range of the entry candidate data is divided by the search target range of other entry candidate data will be described.

Figure 5B:
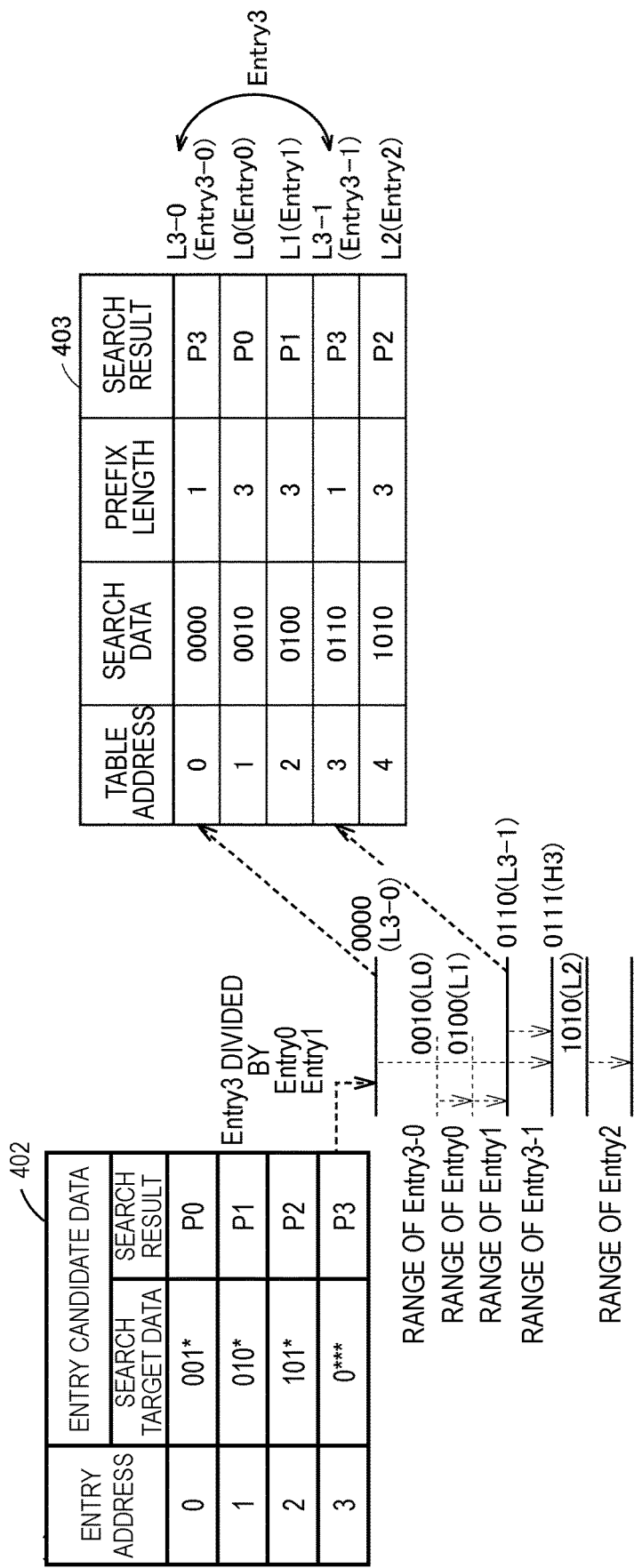

FIG. 5B shows the original search table 402. The original search table 402 stores a plurality of entry candidates Entry0 to 3 to be searched for at entry addresses 0 to 3, respectively. In the present embodiment, four entry candidate data are stored in the original search table 402.

The entry candidate data includes search target data including a bit to be masked, and search result data to be output as a search result when the search target data matches the search key.

FIG. 5B also shows the search target ranges of the original search table 402 according to first embodiment.

The search target range of each entry candidate data is shown in the center of FIG. 5B. Specifically, the search target range of the search target data "001*" of the entry candidate data Entry0, the search target range of the search target data "010*" of the entry candidate data Entry1, the search target range of the search target data "101*" of the entry candidate data Entry2, and the search target range of the search target data "0***" of the entry candidate data Entry3 are shown.

In this case, a case is shown in which the search target range of the search target data "0***" of the entry candidate data Entry3 overlaps the search target range of the search target data "001*" of the entry candidate data Entry0 and the search target range of the search target data "010*" of the entry candidate data Entry1.

That is, the search target range of the search target data "0***" of the entry candidate data Entry3 is divided by the search target data "001*" of the entry candidate data Entry0 and the search target data "010*" of the entry candidate data Entry1.

In first embodiment, since the search target range of the entry candidate data Entry3 is divided as described above, a new entry candidate data Entry3-1 including search target data different from the entry candidate data Entry3-0 whose Entry3 lower limit is set to the search data "0000" is added.

The entry data addition setting unit 266 adds new entry candidate data. The entry data adding unit 266 adds the entry data Entry3-1 of the search target range excluding the search target range of the search data "001*" of the entry candidate data Entry0 and the search data "010*" of the entry candidate data Entry1 from the search target range of the search data "0***" of the entry candidate data Entry3.

In this regard, the entry data adding unit 266 sets the data "0110" indicating the border between the search target range of the entry candidate data Entry1 and the search target range of the entry candidate data Entry3 as the search data.

Then, the entry data adding unit 266 sets new entry data associating the search data with the prefix length data and the search result data.

The entry data adding unit 266 sets new entry data in which the search data "0110" is associated with the prefix length data "1" and the search result "P3".

In FIG. 5B, a diagram for explaining the search table 403 according to first embodiment is shown. The search data setting unit 262 sets the lower limit value of the search target range of the search target data of each entry candidate data of the original search table 402 as the search data of the search table 403. Then, the entry data setting unit 264 sets entry data associating the search data with the prefix length data and the search result data.

The entry data setting unit 264 stores the set entry data in the search table 403. The entry data adding unit 266 stores the new entry data in the search table 403.

The entry data setting unit 264 sorts the entry data to be stored, and stores the entry data including the search data having a small value at the position where the table address is small.

As shown in FIG. 5B, entry data that has been sorted after adding the entry data are stored in the search table 403 according to first embodiment.

For example, the search data "0000", the prefix length data "1", and the search result data "P3" corresponding to the entry candidate data Entry3-0 are stored in the table address "0".

For example, the search data "0010", the prefix length data "3", and the search result data "P0" corresponding to the entry candidate data Entry0 are stored in the table address "1".

For example, the search data "0100", the prefix length data "3", and the search result data "P1" corresponding to the entry candidate data Entry1 are stored in the table address "2".

For example, the search data "0110", the prefix length data "1", and the search result data "P3" corresponding to the entry candidate data Entry3-1 are stored in the table address "3".

For example, the search data "1010", the prefix length data "3", and the search result data "P2" corresponding to the entry candidate data Entry2 are stored in the table address "4".

The search processing unit 22 can perform binary search operation using the search table.

Binary Search Algorithm According to One Embodiment

FIGS. 6A to 6C are diagrams illustrating a search processing for a search table 403 according to the first embodiment.

The search processing unit 22 accesses the search table 403 and performs a search operation. The search processing unit 22 stores the information of the search process in the result storage unit 24.

FIG. 6A shows a search table 403. Here, the search processing unit 22 performs the search operation for the search key "0010" and the search key "0110".

FIG. 6B shows information of the search process for the search key "0010" stored in the result storage unit 24.

The search processing unit 22 starts the search operation from the intermediate table address "2" of the search table 403.

The search processing unit 22 calculates the upper limit value of the search target range of the entry data based on the search data and prefix length data of the entry data read from the intermediate table address "2" of the search table 403. As an example, the upper limit value "0101" is calculated. Since the search data is the lower limit value of the search target range, it can be seen that the search target range is "0100" to "0101".

The search processing unit 22 executes a matching determination process as to whether a search key is included based on the specified search target range.

In the present embodiment, the search processing unit 22 determines that the search key "0010" is not within the search target range of the entry data. That is, the search result is Miss.

In addition, the search processing unit 22 executes the comparison processing between the search data "0100" and the search key "0010". The next search address is determined based on the comparison result.

When the search key is smaller than the search data (Low) by the comparison processing, the search processing unit 22 reads the entry data corresponding to the lower address as the next search target.

When the search key is larger (High) than the search data, the search processing unit 22 reads the entry data corresponding to the higher order address as the next search target.

In this case, the search key "0010" is lower than the search data "0100". Therefore, the data of the table address "0" which is the lower address is read out because it becomes smaller (Low) by the comparison processing.

As shown in FIG. 6B, in the result storage unit 24, the search result in case where the table address "2" is used as the search address as the first memory access is stored. The case where the upper limit value "0101" is calculated for the search data "0100" is shown. In addition, a low value is stored as the comparison result of the comparison processing. Also, a miss (Miss) is stored as the matching determination process.

Next, the search processing unit 22 reads the lower table address "0" of the search table 403, and performs the search operation using the search key "0010".

The search processing unit 22 calculates the upper limit value of the search target range of the entry data based on the search data and the prefix length data of the entry data read in the same manner as described above. That is, the upper limit value "0111" of the search target range of the entry data of the table address "0" is calculated. Therefore, it is understood that the search target range of the entry data is "0000" to "0111".

The search processing unit 22 executes a matching determination process as to whether a search key is included based on the specified search target range.

In the present embodiment, the search processing unit 22 determines that the search key "0010" includes within the search target range of the entry data. That is, the search result is a match (Hit).

In addition, the search processing unit 22 executes the comparison processing of the search data "0000" and the search key "0010". The next search address is determined based on the comparison result.

In this case, the search key "0010" is greater than the search data "0000". Therefore, since the search key becomes larger (High) by the comparison processing, the upper address "1" is read out.

As shown in FIG. 6B, in the result storage unit 24, the search result in a case where the table address "0" is read as the search address as the second memory access is stored. The case where the upper limit value "0111" is calculated for the search data "0000" is shown. Therefore, the matching determination process is a match (Hit). Here, since the matching determination is Hit, the temporary search result stored in the result storage unit 24 is updated from Miss to P3. In addition, since the result of the comparison processing is large (High), the next search target is a higher-order table address.

Next, the search processing unit 22 reads the upper table address "1" of the search table 403 and performs the search operation using the search key "0010".

The search processing unit 22 calculates the upper limit value of the search target range of the read entry data based on the search data and the prefix length data of the read entry data in the same manner as described above. The upper limit value of the search target range of the entry data of the table address "1" is "0011" based on the read search data and prefix length data.

The search processing unit 22 executes a matching determination process as to whether a search key is included based on the specified search target range.

In the present embodiment, the search processing unit 22 determines that the search key "0010" is included within the search target range of the entry data. That is, the search result is a match (Hit).

In this case, since the table address "1" is the final address, the comparison processing for determining the search address is not executed.

As shown in FIG. 6B, in the result storage unit 24, the search result in a case where the table address "1" is read as the search address as the third memory access. The case where the upper limit value "0011" is calculated for the search data "0010" is shown. In addition, a match is stored as a result of the matching determination process. The search result data "P0" is stored as a temporary search result.

Here, the prefix length data of the entry data of the table address "1" is "3". On the other hand, the prefix length data of the entry data of the table address "0" stored in the result storage unit 24 is "1". Therefore, the search processing unit 22 updates the search result data of the result storage unit 24 to the entry data search result data "P0" of the table address "1" because the prefix length is large (the valid bit length is long). On the other hand, when the prefix length is small, the temporary search result stored in the result storage unit 24 is not updated and the temporary search result is held.

When the matching determination result is Hit, the search processing unit 22 keeps updating the temporary search result when the prefix length is larger than the prefix length of the temporary search result up to the previous time stored in the result storage unit 24, so that the search result having the largest prefix length is held in the result storage unit 24. The search processing unit 22 outputs the final search result data based on the determination result stored in the result storage unit 24 at the end of the binary search of the final address.

Next, the search processing unit 22 will describe the search processing for the search key "0110". FIG. 6C shows information of the search process for the search key "0110" stored in the result storage unit 24.

As described above, the search processing unit 22 starts the search processing from the intermediate table address "2" of the search table 403.

The result storage unit 24 of FIG. 6C shows a case where the table address "2" is read as the search address as the first memory access. The case where the upper limit value "0101" is calculated for the search data "0100" is shown. In addition, a large value (High) is stored as the comparison result of the comparison processing. Also, a miss (Miss) is stored as the result of the matching determination process. The search processing unit 22 reads the entry data corresponding to the upper addresses in the subsequent binary search when the search key is larger than the search data (High) by the comparison processing. In this case, the table address "4" which is the upper address is read out.

As shown in FIG. 6C, in the result storage unit 24, a case where the table address "4" is read as the search address as the second memory access is shown. The case where the upper limit value "1011" is calculated for the search data "1010" is shown. Therefore, a miss (Miss) occurs as the matching determination process. In addition, the comparison result is low by the comparison processing. When the search key is lower than the search data (Low), the search processing unit 22 reads the entry data corresponding to the lower address according to the binary search operation. In this case, the table address "3" which is the lower address is read out.

As shown in FIG. 6C, in the result storage unit 24, a case where the table address "3" is read as the search address as the third memory access is shown. The case where the upper limit value "0111" is calculated for the search data "0110" is shown. Therefore, the result of the matching determination process is a match (Hit). Therefore, the temporary search result is updated, and the search result data "P3" is stored.

The search processing unit 22 outputs final search result data based on the search result stored in the result storage unit 24.

The result storage unit 24 stores the search result data "P3" corresponding to the entry data of the table address "3" which indicates "Hit" in the third memory access. The search result data "P3" is output from the search processing unit 22.

This method allows LPM search to be performed using binary search operation on search tables in accordance with the present first embodiment.

Only the lower limit values of the search target ranges are stored in the search table according to first embodiment. Therefore, since the capacity of the search table according to first embodiment does not become twice the number of entries of the original search table as in the comparative method, the table capacity can be reduced. That is, it is possible to perform the search operation with a small-capacity memory. In addition, unlike the comparative method, it is not necessary to hold two pieces of data as the search result data, and since only one piece of search result data is held, it is also possible to reduce the table capacity in this respect.

Also, by reducing the table capacity, the number of memory accesses can be reduced, and the search processing can be speeded up.

Furthermore, by reducing the number of entry data in the search table, it is possible to shorten the duration required to construct the table.

Second Embodiment

In the generation of the search table according to first embodiment, a method of adding entry data when the search target range of entry candidate data is divided by the search target range of other entry candidate data in FIG. 5B has been described. Therefore, the number of entry data is increased as compared with the case where the search target range of each entry candidate data is not divided by the search target range of other entry candidate data.

In second embodiment, a method of suppressing an increase in the number of entries will be described.

In the above first embodiment, in FIG. 5B, the search target range of the search target data "0***" of the entry candidate data Entry3 overlaps the search target range of the search target data "001*" of the entry candidate data Entry0 and the search target range of the search target data "010*" of the entry candidate data Entry1.

That is, the search target range of the search target data "0***" of the entry candidate data Entry3 is divided by the search target data "001*" of the entry candidate data Entry0 and the search target data "010*" of the entry candidate data Entry1.

In first embodiment, a new entry candidate data Entry3-1 including search data different from the search data "0000" of the entry candidate data Entry3-0 is added.

On the other hand, if the search target data "0***" of the entry candidate data Entry3 is separated from the search target data "001*" of the entry candidate data Entry® overlapping with the search target range and the search target data "010*" of the entry candidate data Entry1, the search target range of the entry candidate data Entry3 is not divided.

Figure 7:
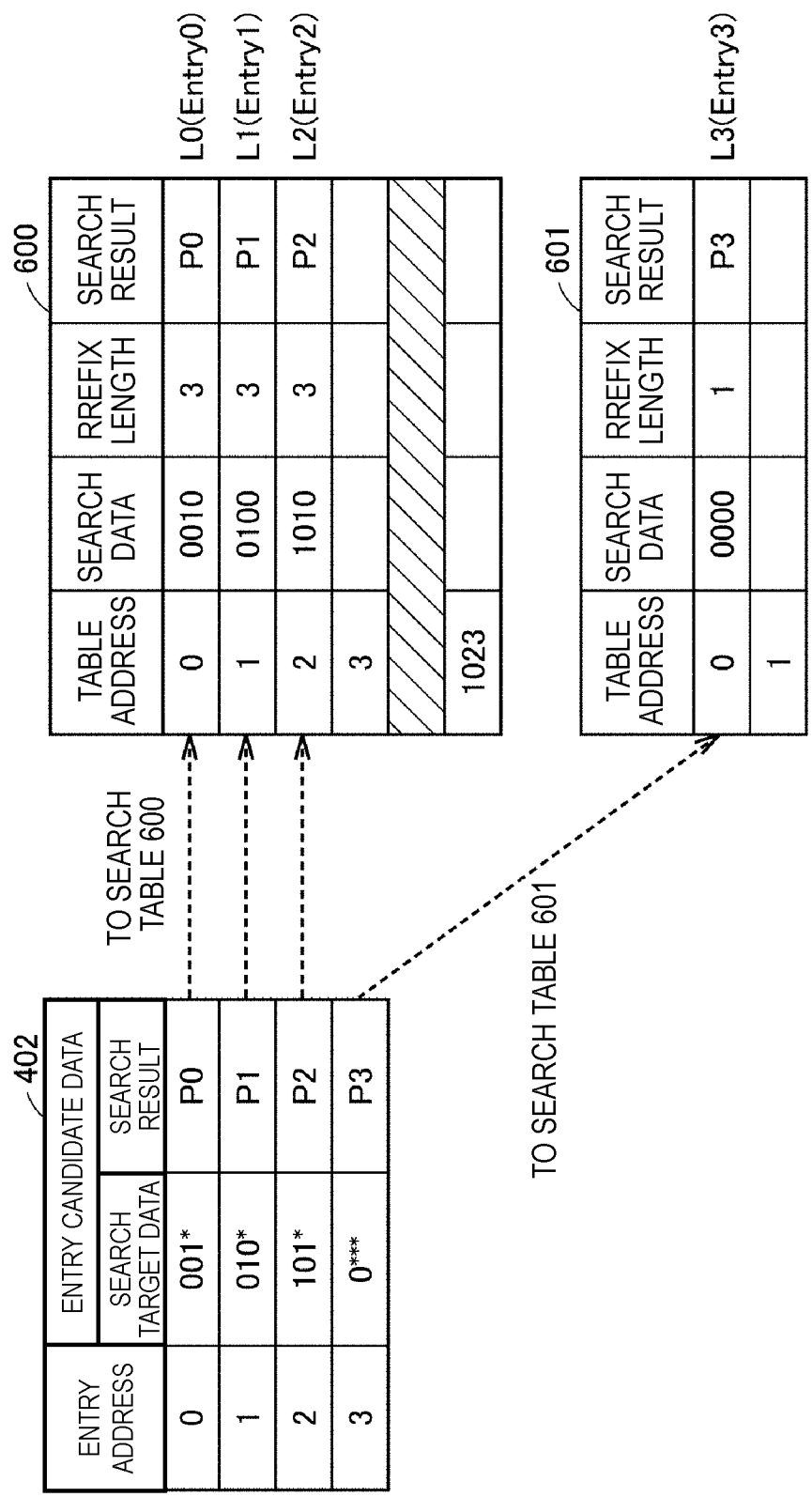
FIG. 7 is a diagram illustrating generation of a search table according to second embodiment.

FIG. 7 is a diagram illustrating generation of a search table according to second embodiment. The search table in second embodiment is generated by the table generation unit 26 in the same manner as first embodiment.

An original search table 402 is shown in FIG. 7. Further, the search tables 600 and 601 are shown in FIG. 7.

In second embodiment, since the configuration of the search circuit is the same as that shown in first embodiment, the detailed description of the search circuit is omitted.

The table generation unit 26 generates a plurality of search tables in accordance with the entry candidate data in the same manner as first embodiment.

Like first embodiment, the search data setting unit 262 sets the lower limit value of the search target data including the bits masked based on the entry candidate data as the search data.

The entry data setting unit 264 sets entry data in which the search data, prefix length data, and search result data are associated with each other.

The entry data setting unit 264 stores the entry data set in the search table.

When storing the entry data set in the search table, the entry data setting unit 264 determines whether the search target range is divided by other entry data. When it is determined that the search target range is divided, the entry data setting unit 264 stores the entry data in the other search table.

In this embodiment, the search data "0010", the prefix length data "3", and the search result data "P0" corresponding to the entry candidate data Entry0 are stored in the table address "0" of the search table 600.

Further, the search data "0100", the prefix length data "3", and the search result data "P1" corresponding to the entry candidate data Entry1 are stored in the table address "1" of the search table 600.

Further, the search data "1010", the prefix length data "3", and the search result data "P2" corresponding to the entry candidate data Entry2 are stored in the table address "2" of the search table 600.

On the other hand, the search data of the entry candidate data Entry3 is stored in a search table 601 which differs from the search table 600 storing the search data of the entry candidate data Entry0 and Entry1 whose the search target range overlap the search target range of the entry candidate data Entry3. That is, the search data "0000", the prefix length data "1", and the search result data "P3" corresponding to the entry candidate data Entry3 are stored in the table address "0" of the search table 601.

By this processing, in each of the search tables 600 and 601, the search target range of the data is not divided by the other entry data.

Figure 8A:
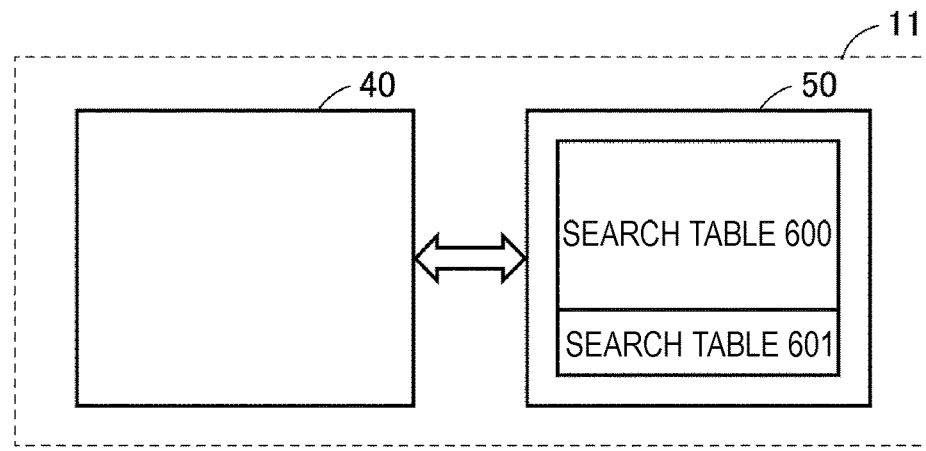
FIGS. 8A to 8C are diagrams for explaining an implementation method of a search table according to second embodiment.
Figure 8B:
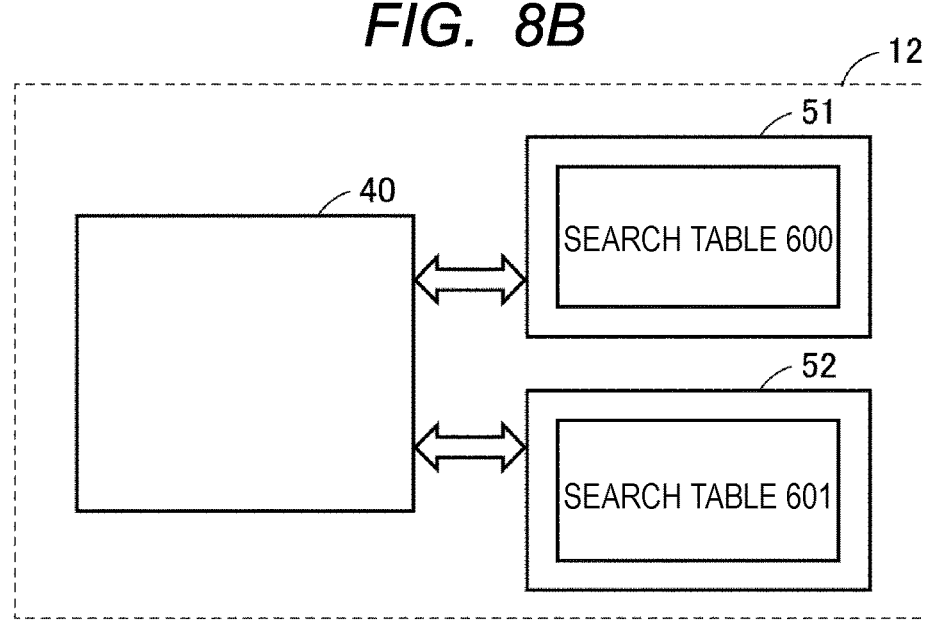
Figure 8C:
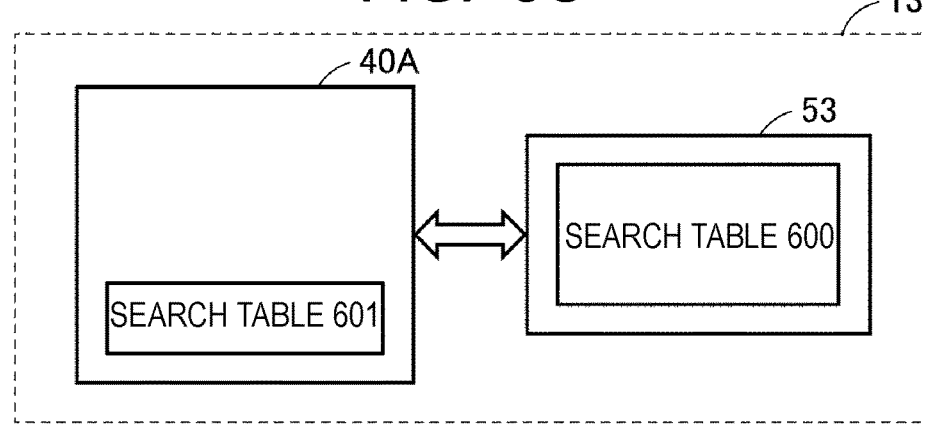

This makes it possible to suppress an increase in the number of entry data. FIGS. 8A to 8C are diagrams for explaining an implementation of search table according to second embodiment.

FIG. 8A shows a search circuit 11 according to second embodiment. The search circuitry 11 includes a CPU40 and memories 50.

CPU40 performs the devices of the processing unit 20 by cooperating with the memory 50. The memory 50 includes search tables 600 and 601.

The processing unit 20 accesses the search tables 600 and 601 stored in the memory 50 to perform a binary search operation on the search tables.

FIG. 8B shows a search circuit 12 according to second embodiment. The search circuit 12 includes a CPU40 and memories 51 and 52. The memory 51 stores a search table 600. The memory 52 stores a search table 601.

The processing unit 20 accesses the search tables 600 and 601 stored in the memories 51 and 52, respectively, so that the binary search operation for the search tables can be performed.

In the search circuit 11, since the search tables 600 and 601 are stored in the memory 50, it is impossible to perform the binary search operation simultaneously in the search tables 600 and 601. However, the search tables 600 and 601 stored in separate memories in the search circuit 12, it is possible to perform the binary search operation in parallel in the search tables 600 and 601. Therefore, the search performance is improved as compared with the search circuit 11.

FIG. 8C shows the search circuits 13 according to second embodiment. The search circuits 13 include a CPU40A and memory 53.

The memory 53 includes a search table 600. CPU40A has a built-in cache memory and stores a search table 601 in the cache memory.

The processing unit 20 accesses the search table 600 stored in the memory 53 to perform the binary search operation for the search table 600. The processing unit 20 can perform the binary search operation on the search table by accessing the search table 601 stored in the cache memory.

Since the search tables 600 and 601 can be operated in parallel in the same manner as the search circuit 12, it is possible to speed up the search operation. Also, since the search table 601 can be expected to be implemented with less capacity than the search table 600, by incorporating it into the cash memory, the required memory 52 can be reduced by the search circuit 12.

Figure 9:
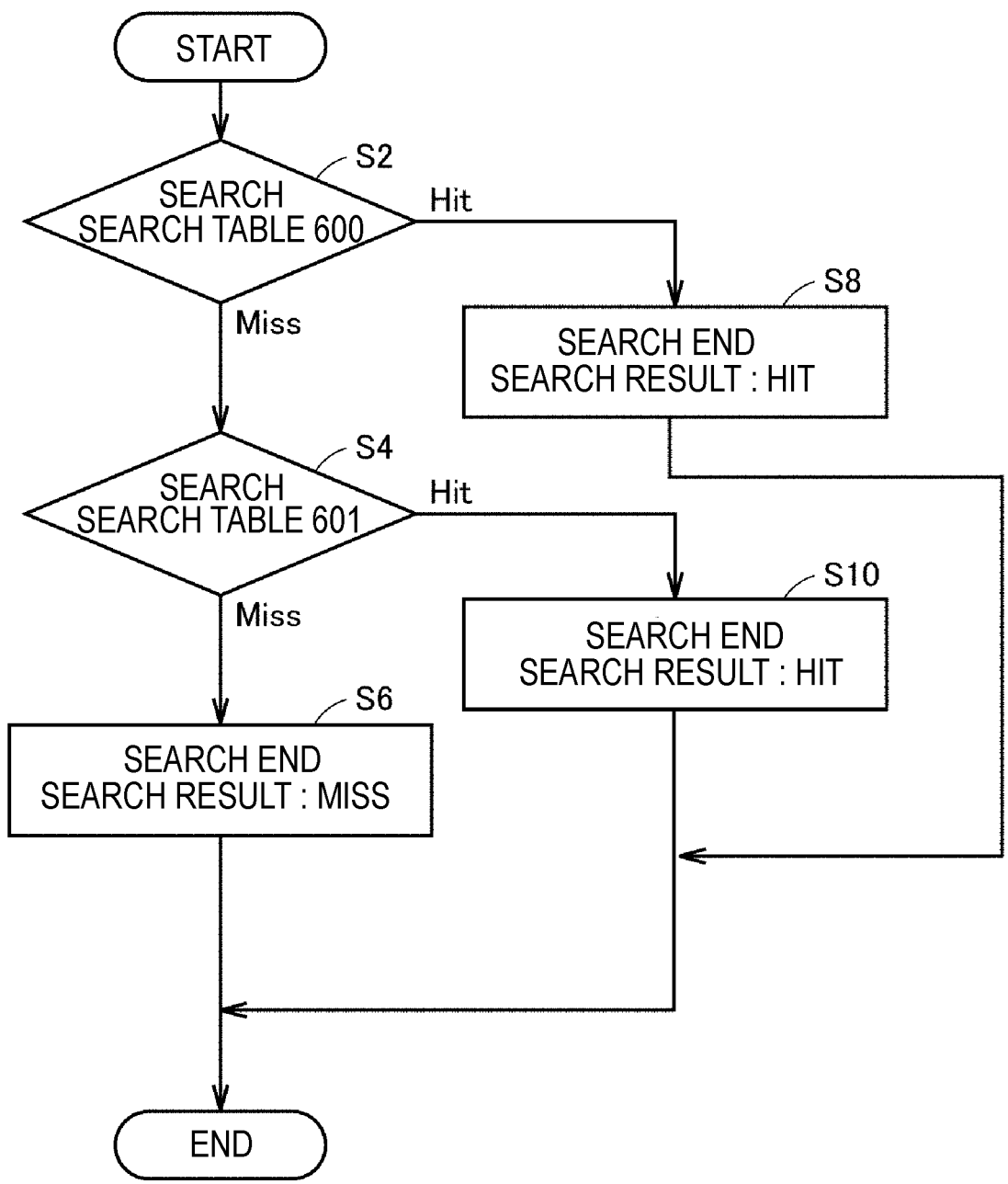
FIG. 9 is a flowchart for explaining the order of the search processing according to second embodiment.

FIG. 9 is a flowchart for explaining the order of the search processing according to second embodiment. Referring to FIG. 9, the processing unit 20 performs a binary search operation on the search table 600 in step S2.

In step S2, in the search processing for the search table 600, when the result of the matching determination processing is a match (Hit) (Hit in step S2), the processing unit 20 ends the search (step S8). Then, the processing unit 20 outputs the search result data corresponding to the entry data having been matched in the search table 600.

On the other hand, in step S2, when the result of the matching determination process is a miss (Miss) in the search processing for the search table 600 (Miss in step S2), the processing unit 20 performs the binary search operation for the search table 601 (step S4).

In step S4, in the search processing for the search table 601, if the result of the matching determination processing indicates a match (Hit) (Hit in step S4), the processing unit 20 ends the search (step S10). Then, the processing unit 20 outputs search result data corresponding to the entry data having been matched in the search table 601.

On the other hand, in step S4, in the search processing for the search table 601, if the result of the matching determination processing is a miss (Miss) (Miss in step S4), the processing unit 20 ends the search. The processor 20 outputs a miss (Miss) as a search result (S6).

Then, the process ends (end). In the method according to second embodiment, a search table having entry data with large prefix length data is searched for in preference to a search table having entry data with small prefix length data.

By this processing, it is possible to suppress an overall increase in the search processing time caused by dividing the search table.

Third Embodiment

In the above second embodiment, a method of reducing the table capacity by suppressing the addition of entry data has been described.

In third embodiment, a method of reducing the table capacity more than second embodiment will be described.

Specifically, by optimizing the set value of the search data, an increase in entry data is avoided.

FIG. 10 is a diagram illustrating generation of another search table according to first embodiment. The search table in third embodiment is generated by the table generation unit 26 in the same manner as first embodiment.

The original search table 404 shown in FIG. 10 stores a plurality of entry candidates Entry0 to 4 to be searched for at entry addresses 0 to 4, respectively. In the present embodiment, five entry candidate data are stored in the original search table 404.

The entry candidate data includes search target data including a bit to be masked, and search result data to be output as a search result when the search target data matches the search key.

Here, as described above, the search target range of the search data "****" of the entry candidate data Entry4 overlaps the search target range of the search data "000*" of the entry candidate data Entry0, the search target range of the search data "010*" of the entry candidate data Entry1, the search target range of the search data "100*" of the entry candidate data Entry2, and the search target range of the search data "110*" of the entry candidate data Entry3.

That is, the search target area of the search target data "****" of the entry candidate data Entry4 is divided by the search target data "000*" of the entry candidate data Entry0, the search target data "010*" of the entry candidate data Entry1, the search target data "100*" of the entry candidate data Entry2, and the search target data "110*" of the entry candidate data Entry3.

As a result, a plurality of new entry candidate data Entry4-1 to Entry4-3 including search data different from the search data "0010" of the entry candidate data Entry4-0 needs to be added.

In FIG. 10, a diagram illustrating the search table 406 to which new entry data is added is shown.

For example, the search data "0000", the prefix length data "3", and the search result data "P0" corresponding to the entry candidate data Entry0 are stored in the table address "000".

For example, the search data "0010", the prefix length data "0", and the search result data "P4" corresponding to the entry candidate data Entry4-0 are stored in the table address "001".

For example, the search data "0100", the prefix length data "3", and the search result data "P1" corresponding to the entry candidate data Entry1 are stored in the table address "010".

For example, the search data "0110", the prefix length data "0", and the search result data "P4" corresponding to the entry candidate data Entry4-1 are stored in the table address "011".

For example, the search data "1000", the prefix length data "3", and the search result data "P2" corresponding to the entry candidate data Entry2 are stored in the table address "100".

For example, the search data "1010", the prefix length data "0", and the search result data "P4" corresponding to the entry candidate data Entry4-2 are stored in the table address "101".

For example, the search data "1100", the prefix length data "3", and the search result data "P3" corresponding to the entry candidate data Entry3 are stored in the table address "110".

For example, search data "1110", prefix length data "0", and search result data "P4" corresponding to the entry candidate data Entry4-3 are stored in the table address "111".

Therefore, in the method according to first embodiment, the number of entry data is increased by three. This occurs because the entry candidate data Entry4 is divided by the other entry candidate data Entry1 to 3.

On the other hand, if the search data of the entry candidate data Entry4 can be executed the search processing in preference to the other search data, the search result data can be obtained by the search processing, and therefore the entry data need not be added.

In this respect, although the search data described in the above first embodiment is set to the lower limit value of the search target range, the search data can be set to any value. The search data can be set to an arbitrary value within the search target range.

Therefore, the search data of the entry candidate data Entry4 is adjusted so as to execute the search processing in preference to other search data.

As shown in the following table, the search data corresponding to entry candidate data, which are included in the entry candidate data Entry4 and have the prefix length data larger than the prefix length data of entry candidate data Entry4, are stored.

Table 3

TABLE 3

| TABLE ADDRESS Add[2:0] | SEARCH DATA | PREFIX LENGTH | ENTRY |
|---|---|---|---|
| 000 (Min) | 0000 | 3 | Entry0 |
| 001 | 0100 | 3 | Entry1 |
| 010 | 1000 | 3 | Entry2 |
| 011 (Max) | 1100 | 3 | Entry3 |
| 100 | | | |
| 101 | | | |
| 110 | | | |
| 111 | | | |

As shown in the above tables, the search data of the entry candidate data Entry0 to 3 included in the search data of the entry candidate data Entry4 are sorted.

The search data "0000" of the entry candidate data Entry0 is stored corresponding to the table address Add "000 (Min)". Also, the search data "1100" of the entry candidate data Entry3 is stored corresponding to the table address Add "011 (Max)".

Therefore, the range of the insertion position of the search data of the entry candidate data Entry4 is the range of (Max)+1 as Entry4 increases, and the entry candidate data Entry4 is inserted somewhere from "000 (Min)" to "100 (Max+1)".

Here, When the search data are sorted, in order for the search data of the entry candidate data Entry4 to be arranged at the position where the binary search operation is first performed in the table addresses "000" to "100", the search data of the entry candidate data Entry4 is inserted into the address in which the most significant bit of the address which is changing within the range of table addresses that can be taken is set to 1.

In the present embodiment, the most significant bit changed in the table address add[2:0] is the address Add[2].

Therefore, the table address Add "100" is the position where the search data of the entry-candidate data Entry4 is inserted. Then, in order to insert the search data into the insert position, "1110" is set as one of the search data in the search target range of the entry candidate data Entry4.

Figure 11:
FIG. 11 is a diagram illustrating generation of a search table according to third embodiment.

FIG. 11 is a diagram illustrating generation of a search table according to third embodiment. In FIG. 11, the original search table 404 is shown.

The original search table 404 stores a plurality of entry candidate data Entry0 to 4 as candidates for generating entry data in accordance with entry addresses 0 to 4, respectively. In the present embodiment, five entry candidate data are stored in the original search table 404.

The entry candidate data includes search target data including a bit to be masked, and search result data to be output as a search result when the search target data matches the search key.

Here, as described above, the search target range of the search target data "****" of the entry candidate data Entry4 overlaps the search target range of the search target data "000*" of the entry candidate data Entry0, the search target range of the search target data "010*" of the entry candidate data Entry1, the search target range of the search target data "100*" of the entry candidate data Entry2, and the search target range of the search target data "110*" of the entry candidate data Entry3.

That is, the search target area of the search target data "****" of the entry candidate data Entry4 is divided by the search target data "000*" of the entry candidate data Entry0, the search target data "010*" of the entry candidate data Entry1, the search target data "100*" of the entry candidate data Entry2, and the search target data "110*" of the entry candidate data Entry3.

Further, in FIG. 11, diagram illustrating the search table 408 according to third embodiment is shown. Specifically, with respect to the entry candidate data which are included in the entry candidate data Entry4 and have the prefix length data is larger than the prefix length data of the entry candidate data Entry4, the lower limit value of the search target data of the entry candidate data is set as the search data.

For example, the search data "0000", the prefix length data "3", and the search result data "P0" corresponding to the entry candidate data Entry0 are stored in the table address "000".

For example, the search data "0100", the prefix length data "3", and the search result data "P1" corresponding to the entry candidate data Entry1 are stored in the table address "001".

For example, the search data "1000", the prefix length data "3", and the search result data "P2" corresponding to the entry candidate data Entry2 are stored in the table address "010".

For example, the search data "1100", the prefix length data "3", and the search result data "P3" corresponding to the entry candidate data Entry3 are stored in the table address "011".

Next, with respect to the entry candidate data having the smaller prefix length data, one of the search data indicated by the search target data of the entry candidate data Entry4 is set as the search data.

In the present embodiment, as described above, the search data is set to "1110" so that the table address Add "100" is the position where the search data of the entry candidate data Entry4 is inserted.

For example, search data "1110", prefix length data "0", and search result data "P4" corresponding to the entry candidate data Entry4 are stored in the table address "100".

The search processing unit 22 can perform the binary search operation using the search table. FIG. 12 is a diagram for explaining a search processing for the search table 408 according to third embodiment.

The search processing unit 22 accesses the search table 408 and executes a search processing. The search processing unit 22 stores the information of the search process in the result storage unit 24.

In FIG. 12, a search table 408 is shown. Here, the search processing unit 22 executes a search processing for the search key "0111".

The right side of FIG. 12 shows information of a search process for the search key "0111" stored in the result storage unit 24.

The search processing unit 22 starts the binary search operation from the intermediate table address "4" ("100") of the search table 408.

The result storage unit 24 shows a case where the table address "4" is read as the search address as the first memory access. An upper limit value "1111" is calculated for the search data "1110". As a result, a case is shown in which the matching determination result of the search key is Hit. Therefore, the search result data "P4" is stored as the temporary search result. In addition, a low value is stored as the comparison result as the comparison processing. When the search key is smaller than the search data (Low), the search processing unit 22 reads the entry data corresponding to the lower address in the next binary search. In this case, the lower address "2" is read out.

Next, as a second memory access, the search processing unit 22 reads the lower table address "2(010)" of the search table 408, and performs a binary search using the search key "0111".

The search processing unit 22 calculates the upper limit value of the search target range based on the search data and the prefix length data of the entry data read in the same manner as described above.

The search processing unit 22 executes a matching determination process as to whether a search key is included based on the determined search target range.

In the present embodiment, the search processing unit 22 determines that the search key "0111" is not within the search target range of the entry data. That is, the search result is Miss. Therefore, the search result data is not updated.

In addition, the search processing unit 22 executes the comparison processing of the search data ("1000") and the search key "0111". The next search address is determined based on the comparison result.

In this entry data, the search key (Key=0111)<search data ("1000"). Therefore, the lower address "1" is read out because it becomes smaller (Low) by the comparison processing. The result storage unit 24 of FIG. 12 shows a case where the table address "1" is read as the search address as the third memory access. The case where the upper limit value "0101" is calculated for the search data "0100" is shown. In addition, a large value (High) is stored as the comparison result as the comparison processing. In addition, a miss (Miss) occurs as the matching determination process. Therefore, the search result data is not updated.

The search processing unit 22 outputs final search result data based on the determination result stored in the result storage unit 24.

The search processing unit 22 outputs the stored search result data "P4". The process enables a binary search operation to be performed on a search table in accordance with the third embodiment.

In third embodiment, the entry data can be prevented from increasing by optimizing the setting values of the search data. Therefore, the table capacity can be further reduced than first embodiment. In the above description, the case where the address range of 3 bits is set as the table address of the search table has been described, but the present invention is also applicable to the case where the address range of 4 bits is set.
Table 4

TABLE 4

| ADDRESS RANGE OF INCLUDED ENTRY DATA | ADDRESS RANGE WHERE ENTRY DATA CAN BE INSERTED | MSB OF CHANGING BITS IN ADDRESS | INSERT POSITION OF ENTRY DATA |
|---|---|---|---|
| 0000-0011 | 0000-0100 | Add[2] | 0100 |
| 1000-1001 | 1000-1010 | Add[1] | 1010 |
| 0100-1001 | 0100-1010 | Add[3] | 1000 |

As shown in the above table, when the address range of 4 bits is set, it is possible to set the insertion position of the entry data according to the most significant bit of the address to be changed.

By setting the search data so as to be at the position, it is possible to execute the search process for the entry data including the search data having the smaller prefix length data with priority over the entry data including the search data having the larger prefix length data.

In the above embodiment, the configuration in which each functional block is realized by executing the program stored in the memory in the CPU as the function of the processing unit 20 has been described, but the present invention is not particularly limited thereto, and each functional block can also be realized by providing a dedicated circuit.

Although the present disclosure has been specifically described based on the embodiments described above, the present disclosure is not limited to the embodiments, and it is needless to say that various modifications can be made without departing from the gist thereof.

What is claimed is:

1. A search circuit comprising:
   a Computer Processing Unit (CPU); and
   one or more memories storing (i) a search table having a plurality of entry data, each of the plurality of entry data including search data, prefix length data and search result data and (ii) a program that, when executed by the CPU, causes the CPU to function as a search processing unit configured to receive a search key and to perform a binary search operation for the search table,
   wherein the search processing unit reads one of the plurality of entry data from the search table according to the binary search operation, specifies a search target range based on the search data and the prefix length data which are included in read entry data, determines whether the search key is included in the search target range, and outputs the search result data of the read entry data based on a determination result,
   wherein the plurality of entry data comprises first entry data and second entry data,
   wherein, when the search processing unit determines that the search key is included in a first search target range specified by first search data and first prefix length data included in the first entry data but the search key does not match the first search data, the search processing unit reads the second entry data from the search table according to the binary search operation and determines whether the search key is included in a second search target range specified by second search data and second prefix length data included in the second entry data, and
   wherein the search processing unit outputs one of first search result data in the first entry data and second search result data in the second entry data based on a comparison result of the first prefix length data and the second prefix length data, when it is determined the search key is included in the second search target range.

2. The search circuit according to claim 1, wherein the search data is a lower limit value of the search target range.

3. The search circuit according to claim 1, wherein the program further causes the CPU to function as a result storage unit configured to store the determination result by the search processing unit.

4. The search circuit according to claim 1,
   wherein the search table is one of a plurality of search tables, and
   wherein the search processing unit performs the binary search operation for each of the plurality of search tables.

5. The search circuit according to claim 4, wherein the search processing unit performs the binary search operation for each of the plurality of search tables in order or in parallel with one another.

6. The search circuit according to claim 1, wherein the program further causes the CPU to function as a table generation unit configured to generate the plurality of entry data to store the search table.

7. The search circuit according to claim 6, wherein the table generation unit comprises:
   a data acquisition unit configured to obtain a plurality of entry candidate data, each of the plurality of entry candidate data including the search result data and search target data having a masked bit;
   a search data setting unit configured to set one of data included in the search target range indicated by the search target data which is obtained by the data acquisition unit as the search data for each entry candidate data; and an entry data setting unit configured to set the search data, the prefix length data based on the entry candidate data and the search result data as the entry data to the search table.

8. The search circuit according to claim 7, wherein the search data setting unit sets a lower limit value in the search target range indicated by the search target data as the search data.

9. The search circuit according to claim 7,
wherein the plurality of entry candidate data comprises first entry candidate data and second entry candidate data, and
wherein the table generation unit further includes,
an entry data adding unit configured to set additional entry data associated with the first entry candidate data, when a first search target range indicated by first search target data in the first entry candidate data includes a second search target range indicated by second search target data in the second entry candidate data.

10. The search circuit according to claim 9, wherein the additional entry data includes additional search data which is a boundary value between the first search target data and the second search target range, first prefix length data based on the first entry candidate data and first search result data based on the first entry candidate data.

11. The search circuit according to claim 7,
wherein the search table is one of a plurality of search tables, and
wherein, when the search target range indicated by the search target data includes another search target range indicated by another entry candidate data, the entry data setting unit sets the search data, the prefix length data and the search result data as the entry data to another search table.

12. The search circuit according to claim 7,
wherein the plurality of entry candidate data comprises first entry candidate data and second entry candidate data, the first entry candidate data including first search result data and first search target data, the second entry candidate data including second search result data and second search target data,
wherein first prefix length data based on the first search target data is smaller than second prefix length data based on the second search target data, and
wherein, when a first search target range indicated by the first search target data includes a second search target range indicated by the second search target data, the search data setting unit sets first search data based on the first search target data so that the search processing unit read the first search data earlier than second search data based on the second search target data according to the binary search operation.

13. The search circuit according to claim 12, wherein the search data setting unit sets a first address for the first search data to be stored in the search table based on an address range to be stored in the search table for search data having prefix length data larger than the first prefix length data.

14. A search circuit comprising:
a Computer Processing Unit (CPU); and
one or more memories storing (i) a search table having a plurality of entry data, each of the plurality of entry data including search data, prefix length data, and search result data and (ii) a program that, when executed by the CPU, causes the CPU to function as:
a search processing unit configured to receive a search key and to perform a binary search operation for the search table, wherein the search processing unit reads one of the plurality of entry data from the search table according to the binary search operation, specifies a search target range based on the search data and the prefix length data which are included in read entry data, determines whether the search key is included in the search target range, and outputs the search result data of the read entry data based on a determination result; and
a table generation unit configured to generate the plurality of entry data to store the search table, wherein the table generation unit comprises:
a data acquisition unit configured to obtain a plurality of entry candidate data, each of the plurality of entry candidate data including the search result data and search target data having a masked bit;
a search data setting unit configured to set one of data included in the search target range indicated by the search target data which is obtained by the data acquisition unit as the search data for each entry candidate data; and
an entry data setting unit configured to set the search data, the prefix length data based on the entry candidate data and the search result data as the entry data to the search table.

15. The search circuit according to claim 14, wherein the search data setting unit sets a lower limit value in the search target range indicated by the search target data as the search data.

16. The search circuit according to claim 14,
wherein the plurality of entry candidate data comprises first entry candidate data and second entry candidate data, and
wherein the table generation unit further includes an entry data adding unit configured to set additional entry data associated with the first entry candidate data, when a first search target range indicated by first search target data in the first entry candidate data includes a second search target range indicated by second search target data in the second entry candidate data.

17. The search circuit according to claim 16, wherein the additional entry data includes additional search data which is a boundary value between the first search target data and the second search target range, first prefix length data based on the first entry candidate data and first search result data based on the first entry candidate data.

18. The search circuit according to claim 14,
wherein the search table is one of a plurality of search tables, and
wherein, when the search target range indicated by the search target data includes another search target range indicated by another entry candidate data, the entry data setting unit sets the search data, the prefix length data and the search result data as the entry data to another search table.

19. The search circuit according to claim 14,
wherein the plurality of entry candidate data comprises first entry candidate data and second entry candidate data, the first entry candidate data including first search result data and first search target data, the second entry candidate data including second search result data and second search target data,
wherein first prefix length data based on the first search target data is smaller than second prefix length data based on the second search target data, and
wherein, when a first search target range indicated by the first search target data includes a second search target range indicated by the second search target data, the search data setting unit sets first search data based on the first search target data so that the search processing unit read the first search data earlier than second search data based on the second search target data according to the binary search operation.

20. The search circuit according to claim 19, wherein the search data setting unit sets a first address for the first search data to be stored in the search table based on an address range to be stored in the search table for search data having prefix length data larger than the first prefix length data.

* * * * *